(12) United States Patent
Uhrlandt et al.

(10) Patent No.: US 8,017,098 B2
(45) Date of Patent: Sep. 13, 2011

(54) ALUMINUM-CONTAINING PRECIPITATED SILICIC ACID HAVING AN ADJUSTABLE BET/CTAB RATIO

(75) Inventors: Stefan Uhrlandt, Belle Mead, NJ (US); Herbert Thoma, Swisttal (DE); Anke Blume, Weilerswist (DE)

(73) Assignee: Evonik Degussa GmbH, Essen (DE)

( * ) Notice: Subject to any disclaimer, the term of this patent is extended or adjusted under 35 U.S.C. 154(b) by 1914 days.

(21) Appl. No.: 10/516,308

(22) PCT Filed: Jun. 7, 2003

(86) PCT No.: PCT/EP03/06001
§ 371 (c)(1),
(2), (4) Date: Dec. 14, 2005

(87) PCT Pub. No.: WO03/106339
PCT Pub. Date: Dec. 24, 2003

(65) Prior Publication Data
US 2006/0093541 A1    May 4, 2006

(30) Foreign Application Priority Data

Jun. 14, 2002 (DE) ................. 102 26 567
May 16, 2003 (DE) ................. 103 22 214

(51) Int. Cl.
*C01B 33/12* (2006.01)
(52) U.S. Cl. ....................................... 423/335
(58) Field of Classification Search ............... 423/335
See application file for complete search history.

(56) References Cited

U.S. PATENT DOCUMENTS

| | | | |
|---|---|---|---|
| 5,800,608 A * | 9/1998 | Bomal et al. ................. | 106/492 |
| 6,180,076 B1 | 1/2001 | Uhrlandt et al. | |
| 6,268,424 B1 * | 7/2001 | Blume et al. ................. | 524/493 |
| 6,613,309 B2 | 9/2003 | Uhrlandt et al. | |
| 6,624,230 B2 | 9/2003 | Luginsland | |
| 6,702,887 B2 | 3/2004 | Uhrlandt et al. | |
| 6,846,865 B2 | 1/2005 | Panz et al. | |
| 6,849,754 B2 | 2/2005 | Deschler et al. | |
| 6,893,495 B2 | 5/2005 | Korth et al. | |
| 6,899,951 B2 | 5/2005 | Panz et al. | |
| 6,984,683 B2 | 1/2006 | Luginsland et al. | |
| 7,022,375 B2 | 4/2006 | Schachtely et al. | |
| 7,074,457 B2 | 7/2006 | Panz et al. | |
| 7,208,038 B2 | 4/2007 | Korth et al. | |
| 7,220,449 B2 | 5/2007 | Schachtely et al. | |
| 2003/0059380 A1 | 3/2003 | Uhrlandt et al. | |
| 2003/0082090 A1 | 5/2003 | Blume et al. | |
| 2007/0059232 A1 | 3/2007 | Stenzel et al. | |
| 2007/0100057 A1 | 5/2007 | Stenzel et al. | |

FOREIGN PATENT DOCUMENTS

| | | |
|---|---|---|
| EP | 0 983 966 | 3/2000 |
| WO | 02/051749 | 7/2002 |

OTHER PUBLICATIONS

U.S. Appl. No. 11/058,293, filed Feb. 16, 2005, Blume, et al.
U.S. Appl. No. 10/542,850, filed Jul. 21, 2005, Luginsland, et al.
U.S. Appl. No. 10/542,763, filed Jul. 20, 2005, Stenzel, et al.

* cited by examiner

*Primary Examiner* — Melvin C Mayes
*Assistant Examiner* — Yun Qian
(74) *Attorney, Agent, or Firm* — Oblon, Spivak, McClelland, Maier & Neustadt, L.L.P.

(57) ABSTRACT

The present invention relates to precipitated silica containing aluminum, which has an adjustable BET/CTAB ratio, a process for its manufacture and its use.

19 Claims, 1 Drawing Sheet

Figure 1:
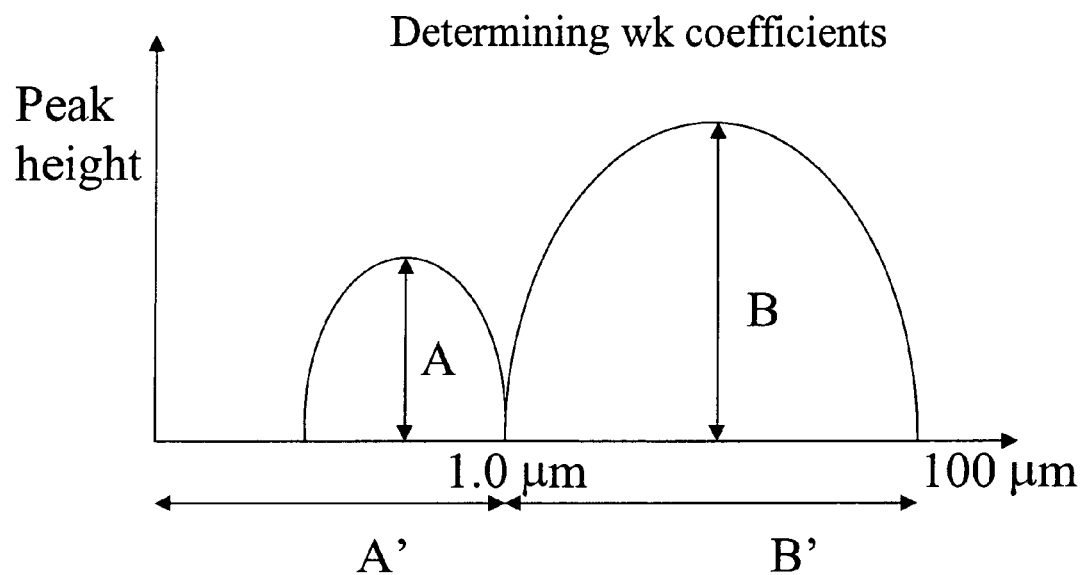

$$WK = \frac{\text{peak level of non-degradable particles (B)}}{\text{peak level of degraded particles (A)}}$$

A' = range of 0 to < 1.0 μm
B' = range of 1.0 μm – 100 μm

ALUMINUM-CONTAINING PRECIPITATED SILICIC ACID HAVING AN ADJUSTABLE BET/CTAB RATIO

The present invention relates to precipitated silica containing aluminum, which has an adjustable BET/CTAB ratio, a process for its manufacture and its use.

The use of precipitated silicas in elastomer mixtures such as tires has been known for some time. High demands are placed on silicas used in tires. They should be easily dispersible in rubber, and, optionally in the presence of coupling reagents, should have a good connection with the polymer chains contained in rubber or the other fillers. Apart from the dispersibility of silica, the specific surface areas (BET or CTAB) and the oil absorption capacity (DBP) are important. The specific surface areas are a measure for the total (BET) surface area or the outer (CTAB) surface area of silica, as both these methods utilize molecules of varying size as adsorbate. The ratio of both these surface area coefficients (i.e. the BET/CTAB surface area quotient) provides an indication of the pore size distribution of the silica and the relation of "total" to "outer" surface of the silica. The surface properties of silicas substantially determine their possible application, or specific applications of a silica (e.g. carrier systems or fillers for elastomer mixtures) require certain surface properties.

U.S. Pat. No. 6,013,234 thus discloses the manufacture of precipitated silica with a BET and CTAB surface area respectively of 100 to 350 $m^2/g$. This silica is particularly suited to incorporation in elastomer mixtures, where the BET/CTAB ratios are between 1 and 1.5. EP 0 937 755 discloses various precipitated silicas, which have a BET surface area of approx. 180 to approx. 430 $m^2/g$ and a CTAB surface area of approx. 160 to 340 $m^2/g$. These silicas are particularly suitable as carrier material and have a BET to CTAB ratio of 1.1 to 1.3. EP 0 647 591 discloses a precipitated silica, which has a ratio of BET to CTAB surface area of 0.8 to 1.1, whereby these surface coefficients can take on absolute values of up to 350 $m^2/g$. EP 0 643 015 discloses a precipitated silica, which can be used as abrasive and/or thickening components in tooth pastes, which has a BET surface area of 10 to 130 $m^2/g$ and a CTAB surface area of 10 to 70 $m^2/g$, i.e. a BET to CTAB ratio of approx. 1 to 5.21.

Precipitated silica containing aluminum as filler are frequently used in the manufacture of tires.

Thus, EP 0 983 966 discloses a precipitated silica containing aluminum with the following physicochemical properties:

| | |
| --- | --- |
| BET surface area | 80-180 $m^2/g$ |
| CTAB surface area | 80-139 $m^2/g$ |
| DBP number | 100-320 g/100 g |
| $Al_2O_3$ content | <5%. |

Precipitated silicas of this kind can be improved with respect to their use as elastomer filler.

It was discovered that a precipitated silica containing aluminum with a high BET surface area is particularly well suited as a filler (e.g. for tires).

The object of the present invention is therefore precipitated silicas, which have

| | | |
| --- | --- | --- |
| BET surface area | in the range | 150-400 $m^2/g$, preferably 190-300 $m^2/g$ |
| CTAB surface area | in the range | 140-350 $m^2/g$, preferably 145-250 $m^2/g$; 145-200 $m^2/g$ |
| $Al_2O_3$ content | in the range | 0.2-5 % by weight, preferably 1-3% by weight. |

The preferred areas can each be adjusted independently of one another.

The precipitated silicas according to the present invention preferably have a specific ratio of BET to CTAB surface area. The BET/CTAB ratio can be in the following ranges: 1.0-1.6, preferably 1.2-1.6.

In addition, the precipitated silicas can be characterized by a wk coefficient (ratio of the peak level of particle size distribution of the particles not degradable by ultrasound in the size range 1.0-100 μm to the peak level of the degraded particles in the size range <1.0 μm) of ≦3.4, preferably 0.1 to 3.4, particularly preferably 0.1 to 3.0 and/or by a DBP absorption of 180-320 g/100 g, in which case the silicas in a first embodiment of the present invention have a DBP in the preferred ranges 200-320 g/100 g; 250-320 g/100 g and 250-300 g/100 g and in a further embodiment of the present invention have a DBP with the preferred range 180-300 g/100 g and 180-250 g/100 g.

Known precipitated silicas have clearly higher wk coefficients and/or maximums displaced to other values in the particle size distributions.

It has been shown that the wk coefficient is a measure for the dispersibility of a precipitated silica, as it is a measure for the decomposability (dispersibility) of the precipitated silica. A precipitated silica is all the more easily dispersible the smaller the wk coefficient is, i.e. the more particles are decomposed when incorporated into rubber.

The BET or CTAB surface areas or their ratio of the precipitated silica according to the present invention are preferably in the following areas:

| BET [$m^2/g$] | CTAB [$m^2/g$] | BET/CTAB ratio |
| --- | --- | --- |
| 195 | 145 | 1.34 |
| 200 | 150 | 1.33 |
| 210 | 149 | 1.41 |
| 280 | 147 | 1.90 |
| 315 | 148 | 2.13 |
| 350 | 150 | 2.33 |
| 370 | 152 | 2.43 |

The precipitated silicas according to the present invention have surface properties, which make them particularly well suited as filler for elastomers. This can be ascertained by the modified Sears number $V_2$, which here is preferably between 5 and 35 ml/5 g, particularly preferably between 20 and 30 ml/5 g.

Another object of the present invention is a process for manufacture of a precipitated silica with a

| | | |
| --- | --- | --- |
| BET surface area | in the range | 150-400 $m^2/g$ |
| CTAB surface area | in the range | 140-350 $m^2/g$ |
| $Al_2O_3$ content | in the range | 0.2-5% by weight, | where
a) an aqueous water glass solution is filled into a vessel
b) water glass and acidifier are metered into this vessel with stirring at 55-95 ° C. for 30-100 minutes simultaneously, c) acidified with acidifier to a pH value of approx. 5 and
d) filtered and dried, on the condition that aluminum compounds are added in steps b) and/or c).

The silicas manufactured by the process according to the present invention have the above-mentioned preferred ranges for the parameters BET, CTAB, DBP, $Al_2O_3$ content and Sears number.

The water glass solution introduced in step a) can have the same concentration as the water glass used in step b) (e.g. density 1.34%, 27.4%, $SiO_2$, 8.1% $Na_2O$). Diluted solutions can also be used, e.g. 0.5-10% $SiO_2$ and correspondingly 0.15% -3% $Na_2O$.

The constituents added in steps b) and c), i.e. water glass and acidifier can each have identical or different concentrations and/or feed rates. In a procedural variant the concentration of the constituents used in both steps is the same, though the feed rate of the constituents in step c) is 125-140% of the feed rate in step b). In another variant the feed rate in step c) is only 30-100, preferably 50-80% of that in step b).

Apart from water glass (sodium silicate solution) other silicates such as potassium silicate can also be used. Sulfuric acid can preferably be used as acidifier, but other acidifiers such as HCl, $HNO_3$, $H_3PO_4$, $CH_3COOH$, or $CO_2$ can also be used.

Aluminum compounds can be added in both steps b) and c), but also only in one of steps b) or c) in each case identical or different as a solid, aqueous solution or as acidifier/aluminum compound mixed solution.

The aluminum compounds can be used as aqueous solutions of preferably $Al_2(SO_4)_3$, but e.g. also $Al(NO_3)_3$, $AlCl_3$ or $Al(OAc)_3$ with a concentration of 50-130 g/l, preferably 70-110 g/l in water. Alternatively, acidifier/aluminum compound mixed solutions can be used.

Filtration and drying of the silicas according to the present invention are known to the expert and can be gleaned from e.g. the above-mentioned patent documents. Silicic acid according to the present invention is preferably dried by short-term drying such as e.g. spray drying (optionally in the spray nozzle dryer), flash and/or spin flash dryer. Spray drying can be carried out e.g. according to U.S. Pat. No. 4,097,771. Here precipitated silica is produced in the spray nozzle dryer, which is obtained in particle form having an average diameter of over 80, in particular over 90, particularly preferably over 200 µm.

After drying, if required grinding and/or granulating with/without a roller compactor can be performed. In this case the average diameter of the end product after granulation is ≦1 mm.

The silicas according to the present invention can accordingly be used e.g. as fillers in elastomer mixtures, vulcanizable rubber mixtures, other vulcanizates in particular for tires, battery separators, anti-blocking agents, matting agents in paints, paper coatings, defoamers, in seals, keypads, conveyor belts and/or window seals.

The silica according to the present invention can be optionally modified with organosilicon compounds (silanes) of formulae I to III

   (I),

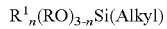   (II), or

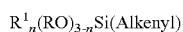   (III), with the following meanings

| | |
|---|---|
| B: | —SCN, —SH, —SC(O)CH₃, —SC(O)(CH₂)₆CH₃, —Cl, —NH₂, —OC(O)CHCH₂, —OC(O)C(CH₃)CH₂ (if q = 1), or —S$_x$— (if q = 2), |
| R and R¹: | an aliphatic, olefinic, aromatic or aryl aromatic radical with 2 to 30 C atoms, which can optionally be substituted by the following groups: hydroxy, amino, alcoholate, cyanide, thiocyanide, halogen, sulfonic acid, sulfonic acid ester, thiol, benzoic acid, benzoic acid ester, carbonic acid, carbonic acid ester, acrylate, methacrylate, organosilane radical, where R and R¹ can have an identical or different meaning or substitution, |
| n: | 0; 1 or 2, |
| alk: | a divalent unbranched or branched hydrocarbon radical with 1 to 6 carbon atoms, |
| m: | 0 or 1, |
| ar: | an aryl radical with 6 to 12 C atoms, preferably 6 C atoms, which can be substituted by the following groups: hydroxy, amino, alcoholate, cyanide, thiocyanide, halogen, sulfonic acid, sulfonic acid ester, thiol, benzoic acid, benzoic acid ester, carbonic acid, carbonic acid ester, organosilane radical, |
| p: | 0 or 1 with the proviso that p and n do not simultaneously mean 0, |
| x: | a number from 2 to 8, |
| r: | 1, 2 or 3, with the proviso that r + n + m + p = 4, |
| alkyl: | a monovalent unbranched or branched unsaturated hydrocarbon radical with 1 to 20 carbon atoms, preferably 2 to 8 carbon atoms, |
| alkenyl: | a monovalent unbranched or branched unsaturated hydrocarbon radical with 2 to 20 carbon atoms, preferably 2 to 8 carbon atoms. |

The silica according to the present invention can also be modified with organosilicone compounds having the composition $R^2_{4-n}SiX_n$ (with n=1,2,3), $[SiR^2_xX_yO]_z$ (with 0≦x≦2; 0≦y≦2; 3≦z≦10, with x+y=2), $[SiR^2_xX_yN]_z$ (with 0≦x≦2; 0≦y≦2; 3≦z≦10, with x+y=2), $SiR^2_nX_mOSiR^2_oX_p$ (with 0≦n≦3; 0≦m≦3; 0≦o≦3; 0≦p≦3, with n+m=3, o+p=3), $SiR^2_nX_mNSiR^2_oX_p$ (with 0≦n≦3; 0≦m≦3; 0≦o≦3; 0≦p≦3, with n+m=3, o+p=3), $SiR^2_nX_m[SiR^2_xX_yO]_z SiR^2_oX_p$ (with 0≦n≦3; 0≦m≦3; 0≦x≦2; 0≦y≦2; 0≦o ≦3; 0≦p≦3; 1≦z≦10000, with n+m=3, x+y=2, o+p=3). These compounds can be linear, cyclic and branched silane, silazane and siloxane compounds. $R^2$ can be alkyl and/or aryl radicals with 1 to 20 carbon atoms, which can be substituted by functional groups such as the hydroxy group, the amino group, polyethers, such as ethylene oxide and/or propylene oxide, and halogenide groups, such as fluoride. $R^2$ may also contain groups such as alkoxy, alkenyl, alkinyl and aryl groups and sulfurous groups. X can be reactive groups such as silanole, amino, thiol, halogenide, alkoxy, alkenyl and hydride groups.

Linear polysiloxanes having the composition $SiR^2_nX_m [SiR^2_xX_yO]_z SiR^2_oX_p$ (with 0≦n≦3; 0≦m≦3; 0≦x≦2; 0≦y≦2; 0≦o≦3; 0≦p≦3; 1≦z≦10000, with n+m=3; x+y=2; o +p=3) are preferably used, in which $R^2$ is preferably represented by a methyl group.

Polysiloxanes having the composition $SiR^2_nX_m [SiR^2_xX_yO]_z SiR^2_oX_p$ (with 0≦n≦3; 0≦m≦1; 0≦x≦2; 0≦y≦2; 0≦o≦3; 0≦p≦1; 1≦z≦1000, with n+m=3, x+y=2, o+p=3) are particularly preferably used, in which $R^2$ is preferably represented by methyl.

Modifying the optionally granulated, ungranulated, ground and/or unground precipitated silica with one or more of the above-mentioned organosilanes can be undertaken in mixtures of 0.5 to 50 parts, relative to 100 parts precipitated silica, in particular 1 to 15 parts, relative to 100 parts precipitated silica, whereby reaction between precipitated silica and organosilane can be carried out during production of the mixture (in situ) or outside of production by spraying and subsequent tempering of the mixture, by mixing of the organosilane and the silica suspension with subsequent drying and tempering (for example according to DE 34 37 473 and DE 196 09 619) or in accordance with the process described in DE 196 09 619 or DE-PS 40 04 781.

All bifunctional silanes, which can on the one hand effect coupling to the filler containing silanole groups and on the other hand coupling to the polymer, are basically suitable as organosilicon compounds. The usual quantities of organosilicon compounds are 1 to 10% by weight, relative to the total quantity of precipitated silica.

Examples for these organosilicon compounds are:

Bis(3-triethoxysilylpropyl)tetrasulfide, bis(3-triethoxysilylpropyl)disulfide, vinyltrimethoxysilane, vinyltriethoxysilane, 3-mercaptopropyltrimethoxysilane, 3-mercaptopropyltriethoxy silane, 3-aminopropyltrimethoxysilane, 3-aminopropyltriethoxysilane. Other organosilicon compounds are described in WO 99/09036, EP 1 108 231, DE 101 37 809, DE 101 63 945, DE 102 23 658.

In a preferred embodiment of the invention bis(3-triethoxysilyl-propyl)tetrasulfide and bis(3-triethoxysilyl-propyl) disulfide can be used as silane.

Use of the Silica According to the Present Invention in Elastomer Mixtures

The silica according to the present invention can be mixed into elastomer mixtures, tires or vulcanizable rubber mixtures as a reinforcing filler in quantities of 5 to 200 parts, relative to 100 parts per rubber as powder, micropearls or granulate and with silane modification or without silane modification.

One or more of the above-mentioned silanes can be added to the elastomers along with the silicas, in which case the reaction between filler and silane occurs during the mixing procedure at increased temperatures (in-situ modification) or in already premodified form (for example DE-PS 40 04 781), that is, both reaction partners are reacted outside the actual mixture production.

Apart from mixtures, which contain exclusively the silicas according to the present invention, with and without organosilanes according to formulae I to III as fillers, the elastomers can additionally be filled with one or more more or less reinforcing fillers. In the first instance a blend between carbon blacks would be useful here (for example furnace, gas, flame, acetylene carbon blacks) and the silicas according to the present invention, with and without silane, but also between natural fillers, such as for example clays, siliceous chalk, other commercial silicas and the silicas according to the present invention.

The blend ratio here also, as with metering of the organosilanes, is aligned with the properties to be achieved in the finished rubber compound. A ratio of 5-95% between the silicas according to the present invention and the other above-mentioned fillers is conceivable and is also realized within this framework.

Apart from the silicas according to the present invention, the organosilanes and other fillers, the elastomers form another important constituent of the rubber mixture. The silicas according to the present invention can be used in all elastomers that can be cross-linked with accelerators/sulfur, but also with peroxides. Examples of these are elastomers, natural and synthetic, oil-extended or not, as single polymers or blend with other rubbers, such as for example natural rubbers, butadiene rubbers, isoprene rubbers, butadiene styrene rubbers, in particular SBR, produced by means of the solution polymerization process, butadiene acrylnitrile rubbers, butyl rubbers, terpolymers made of ethylene, propylene and non-conjugated dienes. The following additional rubbers also come into consideration for rubber mixtures with the above-mentioned rubbers: carboxyl rubbers, epoxide rubbers, transpolypentenamer, halogenated butyl rubbers, rubbers from 2-chlorobutadiene, ethylene vinyl acetate copolymers, ethylene propylene copolymers, and optionally chemical derivatives of natural rubber as well as modified natural rubbers.

Likewise known are other constituents such as plasticizers, stabilizers, activators, pigments, antioxidants and processing aids in the usual dosages.

The silicas according to the present invention, with and without silane, are utilized in all rubber applications, such as for example tires, conveyor belts, seals, V-belts, hoses, shoe soles, etc.

A further object of the invention is elastomer mixtures, in particular vulcanizable rubber mixtures, which contain the silicas according to the present invention in quantities of 5 to 200 parts, relative to 100 parts elastomer or rubber. Processing this silica and manufacturing the mixtures containing this silica are carried out in a manner customary to the rubber industry on a internal mixer or open-roll mill. The available form or form of use can be both powder, micropearls or granulate. Here too the silicas according to the present invention do not differ from the known white fillers.

To achieve a good set of values in a polymer mixture, dispersion of the precipitated silica in the matrix, the polymer, is very decisive.

Use of the Precipitated Silicas According to the Present Invention in Paper Coatings Inks currently in use, which above all are used in all types of so-called inkjet printing and its related processes, are mostly anionic in nature. Therefore, with respect to fixing of the coloring agent (of dyes and/or pigments), the color brilliance, the print sharpness and print depth it is of considerable significance that the media to be printed have on their surface, or in their surface regions, particles with an at least partial cationic surface.

Silicas and silicates today are often used for the above-mentioned coating formulations (e.g. paper, film coating). Modification of these silicas and silicates of such a type where active, i.e. accessible, cationic sites (EP 0 492 263) occur on their surface, complies with current requirements on account of the frequently used anionic coloring agents.

Due to the influence of the inbuilt metallic ions on the refraction index additional advantages can arise with respect to use in transparent media, such as e.g. with the use of silicas/silicates in coatings for foils.

The object of the invention is therefore also the use of the precipitated silica according to the present invention, or the precipitated silica manufactured via the process according to the present invention as an additive in paper manufacture or in paper coatings.

In particular precipitated silicas according to the present invention can be used in paper coatings of e.g. inkjet papers and in coatings for other printed media, such as e.g. overhead films or printable textiles.

The precipitated silicas according to the present invention can be put to use not only as dried and optionally ground products, but also as dispersions. Advantages in further processing or cost advantages can especially be in using dispersed filter cakes of the precipitated silicas according to the present invention for application in paper pulp or in coatings of printable media.

For use in paper manufacture it is possible to mix in auxiliary agents, which are common in the paper industry, such as e.g. polyalcohols, polyvinyl alcohol, synthetic or natural polymers, pigments ($TiO_2$, Fe oxides, Al metal filters), but also undoped silicas, i.e. without aluminum additive (precipitated silicas or aerosils) with the dispersions of the precipitated silicas according to the present invention.

The physicochemical data of the precipitated silicas according to the present invention are determined by the following methods:

BET surface area Areameter, Ströhlein, according to ISO 5794/Annex D

CTAB surface area at pH 9, according to Janzen and Kraus in Rubber Chemistry and Technology 44 (1971) 1287

Determining the Solids Content of Silica Suspensions

The silica suspension (e.g. slurry) is dried in the IR dryer to a constant weight. The drying loss generally predominantly comprises water moisture and only traces of other volatile constituents.

Execution:

2.0 g silica suspension are filled into a previously tared aluminum dish and the cover of the IR dryer unit (Mettler, type LP 16) is closed. Once the start key is pushed drying of the suspension begins at 105° C., which is automatically terminated when the decrease in weight per time unit drops below a value of 2 mg/120 s. The drying loss in % is indicated directly by the device on selection of the 0-100% mode. Measuring is performed as repeat determination.

Determining the Moistness of Silicas

According to this method following ISO 787-2 the volatile portions (herein referred to as moisture for simplicity) of silica are determined after 2 hours of drying at 105° C. This drying loss generally predominantly comprises water moisture.

Execution 10 g of the powder, spherical or granular silica are weighed precisely to 0.1 mg (weighed sample E) into a dry weighing bottle with ground glass cover (diameter 8 cm, height 3 cm). The sample is dried in a drying cabinet with the top open for 2 h at 105±2° C. Next the weighing bottle is sealed and cooled to room temperature in a desiccator cabinet with silica gel as a drying agent. The weighed portion A is determined gravimetrically.

The moisture is determined in % according to (E in g-A in g)×100%/E in g. Measuring is performed as a repeat determination.

Determining DBP Absorption

The DBP absorption (DBP number), which is a measure for the absorptive capacity of the precipitated silica, is determined in accordance with DIN standard 53601 as follows:

Execution 12.50 g powder or spherical silica with 0-10% moisture content (optionally the moisture content is adjusted by drying at 105° C. in the drying cabinet) are added to the kneading chamber (article number 279 061) of the Brabender Absorptometer "E". In the case of granulates the screened fraction of 3.15 to 1 mm (stainless steel screen by Retsch) is used (by gently pressing the granulates through the screen with 3.15 mm pore size using a plastic spatula). With constant stirring (rotational speed of kneader blades 125 rpm) dibutylphthalate is dropped through the "Dosimaten Brabender T 90/50" at a rate of 4 ml/min into the mixture, at room temperature. Mixing takes place with only minimal power consumption and is observed with reference to the digital display. Towards the end of the determination the mixture becomes pasty, which is indicated by means of a steep rise in the power consumption. When 600 digits are displayed (torque of 0.6 Nm) both the kneader and also the DBP metering are switched off by an electrical contact. The synchronous motor for DBP supply is coupled to a digital counter, so that DBP use can be read off in ml.

Evaluation

DBP absorption is indicated in g/100 g and calculated using the following formula from measured DBP usage. The density of DBP at 20° C. is typically 1.047 g/ml.

DBP absorption in g/100 g=DBP usage in ml×density of DBP in g/ml×100/12.5 g.

DBP absorption is defined for water-free, dried silica. When moist precipitated silicas are used the value is to be corrected by means of the following correction table. The corrected value corresponding to the water content is added to the experimentally determined DBP value; e.g. a water content of 5.8% would mean the addition of 33 g/100 g for DBP absorption.

| Correction table for dibutylphthalate absorption -water-free- | | | | | |
|---|---|---|---|---|---|
| | .% water | | | | |
| % water | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determining wk Coefficients: Aggregate Size Distribution by Means of Laser Diffraction Sample Preparation If the silica to be determined is a granulate, then 5 g of the granular silica are added to a beaker and the coarse granulate pieces are crushed with a pestle but not pounded. 1.00 g of the crushed, powder or spherical silica with 5±1% moisture content (optionally the moisture content is adjusted by drying at 105° C. in the drying chamber or uniform humidifying), which was manufactured no more than 10 days beforehand, is weighed into a 30 ml centrifuge tube with a convex base (height 7 cm, Ø 3 cm, depth of convex bulging 1 cm) and mixed with 20.0 ml dispersion solution (hydrophilic silicas: 20.0 g sodium hexametaphosphate (by Baker) filled to 1000 ml with deionized water; hydrophobic silicas: 200.0 ml reagent grade ethanol with 2.0 ml concentrated ammonia solution and 0.50 g Triton X-100 (by Merck) filled to 1000 ml with deionized water). Then the centrifuge tube is placed into a double-walled glass cooling vessel (80 ml volumetric capacity, height 9 cm, Ø 3.4 cm) with cold water connections for tap water (20° C.) and the sample is treated for 270 s with an ultrasound finger (by Bandelin, type UW 2200 with Horn DH 13 G and diamond plate Ø 13 mm). For this 50% power and 80% pulse (corresponds to 0.8 s power and 0.2 s pause) is set on the power supply unit (Sonopuls, by Bandelin, type HD 2200) of the ultrasound finger. Heating of the suspension is adjusted by water cooling to maximum <8° C. As soon as the sample is added to the liquid module of the laser diffraction unit within 15 min, the suspension is stirred with a magnetic stirrer to prevent possible sedimentation.

Execution

Prior to measuring, the laser diffraction unit LS 230 (by Coulter) and the liquid module (LS Variable Speed Fluid Module Plus with integrated ultrasound finger CV 181, by Coulter) is left to run warm for 2 h and the module (menu "Control/rinse") is rinsed for 10 min.

In the task bar of the unit software the menu feature "Measurement" is used to select the file window "Calculate Opt. Model" and the refraction indices are defined in a .rtf file as follows: fluid refraction index B. I. Real=1.332; Material refraction index Real=1.46; Imaginary=0.1.

In the file window "Measuring cycle" the output of the pump speed is set to 26% and the ultrasound output of the integrated ultrasound finger CV 181 is set to 3. The ultrasound features "during sample adding", "10 seconds before each measurement" and "during measuring" are to be activated. In addition, the following features are selected in this file window:

set offset measurement, adjustment, background measurement, measurement concentration, input sample info, input measurement info, start 2 measurements, autom. rinse, with PIDS data.

On completion of calibration measuring with an LS Size Control G15 Standard (by Coulter) and background measuring samples are added. Suspended silica is added until such time as light absorption of 45-55% is achieved and the unit displays "OK".

Measuring is done at room temperature with the evaluation model of the .rtf file defined hereinabove. Three repeated tests each of 60 seconds with a wait time of 0 seconds of each silica sample are carried out.

From the raw data curve the software calculates the particle size distribution on the basis of volume distribution, taking into consideration the Mie theory and the optical model by Fraunhofer. Typically, a bimodal distribution curve is found with an A mode between 0-1 μm (maximum at approx. 0.2 μm) and a B mode between 1-100 μm (maximum at approx. 5 μm). According to FIG. 1 the wk coefficient can be determined from this and is given as an average value of six individual measurements.

An essential point here is that the energy input via ultrasound represents a simulation of the energy input via mechanical forces in industrial mixers in the tire industry.

FIG. 1 is a schematic illustration of the values required to calculate the wk coefficients.

The curves show a first maximum in particle size distribution in the range um 1.0-100 μm and show another maximum in the range <1.0 μm. The peak in the range 1.0-100 μm gives the portion of uncomminuted silica particles after ultrasound treatment. These fairly coarse particles are poorly dispersed in the rubber mixtures. The second peak with much smaller particle sizes (<1.0 μm) indicates that portion of silica particles which has been comminuted during ultrasound treatment. These very small particles are very well dispersed in rubber mixtures.

The wk coefficient is now the ratio of the peak level of the non-degradable particles (B), whose maximum is in the range 1.0-100 μm (B'), to the peak level of the degraded particles (A), whose maximum is in the range <1.0 μm (A').

Determining the Modified Sears Number of Silicas

The modified Sears number (hereinafter referred to as Sears number $V_2$) as measure for the number of free hydroxyl groups can be determined through titration of silica with potassium hydroxide solution in the range of pH 6 to pH 9.

The following chemical reactions form the basis of the determination method, where "Si"—OH is used to symbolize a silanole group:

| "Si"—OH + NaCl | "Si"—ONa + HCl |
|---|---|
| HCl + KOH | KCl + $H_2O$. |

Execution 10.00 g of a powder, spherical or granular silica with 5±1% moisture are ground for 60 seconds in the IKA M 20 universal mill (550 W; 20,000 rpm). If required, the moisture content must be adjusted by drying at 105° C. in the drying chamber or by even humidifying. 2.50 g of the silica thus treated are weighed at room temperature into a 250 ml titrating vessel and mixed with 60.0 ml reagent grade methanol. After the sample is fully perfused 40.0 ml deionized water are added and the whole is dispersed by means of Ultra Turrax T 25 (KV-18G agitator shaft, 18 mm diameter) for 30 seconds at a speed of 18,000 rpm. The sample particles adhering to the vessel edge and stirrer in the suspension are rinsed with 100 ml deionized water and tempered in a thermostatic water bath to 25° C.

The pH meter (by Knick, type: 766 Calimatic pH meter with temperature sensor) and the pH electrode (single-rod measuring chain by Schott, type N7680) are calibrated at room temperature using buffer solutions (pH 7.00 and 9.00). First, the starting pH value of the suspension at 25° C. is measured with the pH meter, and then depending on the outcome, it is adjusted with a potassium hydroxide solution (0.1 mol/l) or hydrochloric acid solution (0.1 mol/l) to a pH value of 6.00. The KOH or HCl solution consumption in ml up to pH 6.00 corresponds to $V_1'$.

After this 20.0 ml sodium chloride solution (250.00 g reagent grade NaCl. filled with deionized water to 1 l) are added. Titration to pH 9.00 is continued with 0.1 mol/l KOH. The KOH solution consumption in ml up to pH 9.00 corresponds to $V_2'$.

Next the volumes $V_1'$, or $V_2'$ are first standardized to the theoretical weighed sample of 1 g and supplemented with five, resulting in $V_1$ and Sears number $V_2$ in ml/5 g units. The measurements are each performed as repeat determinations.

EXAMPLES

Example 1

51.5 l water and 3.8 l water glass (density 1.346 kg/l, 27.4% $SiO_2$, 8.1% $Na_2O$) are introduced into a reactor made of high-quality stainless steel with propeller stirring gear and double shell heating.

Then 8.2 l/h water glass, 0.345 l/h aluminum sulfate solution (110 g/l $Al_2O_3$) as well as 0.6 l/h sulfuric acid (96%, density 1.84 kg/l) are metered with vigorous stirring at 87° C. for 80 minutes. On completion of the preset metering period the supply of water glass and aluminum sulfate solution is stopped and more sulfuric acid is added, until a pH (measured to suspension tempered to 20° C.) of 5.0 is reached.

The resulting suspension is filtered as usual and washed with water to a sodium sulfate content <4% by weight. The filter cake is liquefied with aqueous sulfuric acid and a shearing unit. The silica slurry with 16% solids content is then spray-dried.

The resulting powder product has a BET surface area of 195 $m^2/g$ and a CTAB surface area of 145 $m^2/g$, a DBP absorption of 306 g/100 g as well as a wk coefficient of 1.46. The aluminum oxide content of the end product is 1.0% and the Sears number $V_2$ is 25.7 ml/5 g.

Example 2

51.5 l water and 3.8 l water glass (density 1.346 kg/l, 27.4% $SiO_2$, 8.1% $Na_2O$) are introduced into a reactor made of high-quality stainless steel with propeller stirring gear and double shell heating.

Then 8.2 l/h water glass, 0.865 l/h aluminum sulfate solution (110 g/l $Al_2O_3$) as well as 0.475 l/h sulfuric acid (96%, density 1.84 kg/l) are metered with vigorous stirring at 85° C. for 80 minutes. On completion of the specified metering period the supply of water glass and aluminum sulfate solution is stopped and more sulfuric acid is added, until a pH (measured to suspension tempered to 20° C.) of 5.0 is reached.

The resulting suspension is filtered as usual and washed with water to a sodium sulfate content <4% by weight. The filter cake is liquefied with aqueous sulfuric acid and a shearing unit. The silica slurry with 16% solids content is then spray-dried.

The resulting powder product has a BET surface area of 200 $m^2$/g and a CTAB surface area of 150 $m^2$/g, a DBP absorption of 285 g/100 g as well as a wk coefficient of 2.78. The aluminum oxide content of the end product is 2.0% and the Sears number $V_2$ is 23.2 ml/5 g.

Example 3

51.5 l water and 3.8 l water glass (density 1.346 kg/l, 27.4% $SiO_2$, 8.1% $Na_2O$) are introduced into a reactor made of high-quality stainless steel with propeller stirring gear and double shell heating.

Then 8.2 l/h water glass, 2.170 l/h aluminum sulfate solution (110 g/l $Al_2O_3$) as well as 0.185 l/h sulfuric acid (96%, density 1.84 kg/l) are metered with vigorous stirring at 83° C. for 80 minutes. On completion of the preset metering period the supply of water glass and aluminum sulfate solution is stopped and more sulfuric acid is added at a flow rate of 0.475 l/h, until a pH (measured to suspension tempered to 20° C.) of 5.0 is reached.

The resulting suspension is filtered as usual and washed with water to a sodium sulfate content <4% by weight. The filter cake is liquefied with aqueous sulfuric acid and a shearing unit. The silica slurry with 18% solids content is then spray-dried.

The resulting powder product has a BET surface area of 210 $m^2$/g and a CTAB surface area of 149 $m^2$/g, a DBP absorption of 247 g/100 g as well as a wk coefficient of 3.11. The aluminum oxide content of the end product is 4.5% and the Sears number $V_2$ is 25.7 ml/5 g.

Example 4

In following example the following substances are used:

| | |
|---|---|
| Krynol 1712 | Styrene butadiene rubber based on emulsion polymerization |
| X 50 S | 50:50 blend of Si 69 (bis(3-triethoxysilylpropyl) tetrasulfane and N 330 (carbon black, commercial product by Degussa AG) |
| ZnO | zinc oxide |
| Stearic acid | |
| Naftolene | aromatic oil |
| Lipoxol 4000 | polyethylene glycol |
| Vulkanox 4020 | N-(1,3-dimethylbuty1)-N'-phenyl-p-phenylendiamine |
| DPG | diphenylguanidine |
| CBS | N-cyclohexyl-2-benzthiazylsulfenamide |
| Sulfur | |

The precipitated silicas according to the present invention are mixed in as powder in comparison to the standard silica Ultrasil VN2 GR (Degussa AG) in a pure E-SBR mixture (data in phr):

| | |
|---|---|
| Krynol 1712 | 137.5 |
| Silica | 50 |
| X 50 S | 3 |
| ZnO | 3 |
| Stearic acid | 1 |
| Vulkanox 4020 | 2 |
| Lipoxol 4000 | 1.5 |
| DPG | 1.5 |
| CBS | 1.5 |
| Sulfur | 2.2 |

A Werner & Pfleiderer 1.5 N type mixer was used, at 45 $min^{-1}$, at 1:1.11 friction, at a ram pressure of 5.5 bar, a void fraction of 1.6 l, a filling level of 0.73 and a throughflow temperature of 90° C. The mixing process used was a 3-step method : step 1 0-1 min polymers, 1-2 min additional constituents apart from accelerator and sulfur, cleanse for 2 min, mix for 2-5 min and cleanse (from 3 min mix at 70 $min^-$), discharge. The mixture is then stored for 24 h at room temperature. Step 2: 0-1 min batch step 1 plasticize at 70 $min^{-1}$ and 0.71 filling level, 1-3 min maintain batch temperature of 150° C. by speed variation, 3 min discharge, store for 4 h at room temperature. Step 3: 0-2 min batch step 2, mix accelerator and sulfur at 40 $min^{-1}$ and 50° C. throughflow temperature and filling level 0.69, discharge after 2 min and form a band on a laboratory mixing roller (diameter 20 mm, length 450 mm, throughflow temperature 50° C.), homogenize through 3×right and shear 3×left, tumble 3×with wide (3.5 mm) and 3×with narrow (1 mm) roll nip, discharge band.

Vulcameter testing at 160° C. was performed in accordance with DIN 53529/2 or ISO 6502, voltage moduli and elongation at break were determined in accordance with DIN 53504, Shore hardness in accordance with DIN 53 505 at 23° C., ball rebound in accordance with ASTM D 5308, heat build up in accordance with ASTM D 623 A ('0.175 inch, stroke, 25 min), MTS data in accordance with ASTM D 2231-87 (10 Hz, 10% prestrained, Ampl. Sweep: 0.15-7%), dispersion coefficient determined by means of surface topography [A. Wehmeier, "Filler Dispersion Analysis by Topography Measurements", Technical Report TR 820, Degussa AG, Applied Technology Advanced Fillers].

| | | Ultrasil VN2 GR | Silica according to invention, Ex. 1 | Silica according to invention, Ex. 2 |
|---|---|---|---|---|
| ML(1 + 4) at 100° C.; 2nd | [ME] | 51 | 52 | 56 |
| MDR: 160° C.; 0.5° | | | | |
| t 90% | [min] | 9.9 | 9.6 | 9.8 |
| t 80%-t 20% | [min] | 2.7 | 2.6 | 2.6 |
| Vulcanizate data | | | | |
| Module 100% | [MPa] | 1.1 | 1.3 | 1.3 |
| Module 300% | [MPa] | 4.6 | 5.3 | 5 |
| Strain at break | [%] | 470 | 450 | 420 |

|  |  | Ultrasil VN2 GR | Silica according to invention, Ex. 1 | Silica according to invention, Ex. 2 |
|---|---|---|---|---|
| Shore A hardness | [SH] | 52 | 52 | 52 |
| Ball Rebound, 0° C. | [%] | 19.3 | 19.5 | 20.5 |
| Ball Rebound, 60° C. | [%] | 65 | 65.4 | 67.8 |
| Goodrich Flexometer, 0.225 inch, 25 min, RT | | | | |
| Heat Build Up | [° C.] | 79 | 79 | 79 |
| Permanent Set | [%] | 1.8 | 1.7 | 1.7 |
| MTS, 16 Hz, 50 N +/− 25 N | | | | |
| E*, 0° C. | [MPa] | 7.7 | 8.4 | 8.3 |
| E*, 60° C. | [MPa] | 5.0 | 5.2 | 5.2 |
| tan d, 0° C. | [−] | 0.282 | 0.277 | 0.263 |
| tan d, 60° C. | [−] | 0.100 | 0.102 | 0.100 |
| Dispersion, topography | | | | |
| Peak area | [%] | 3.9 | 1.8 | 2.6 |

Compared to the standard silica Ultrasil VN2 GR the silicas 1 and 2, according to the present invention, result in higher modulus values, higher elongations at break, higher E* values and clearly improved dispersion (corresponding to better abrasion resistance). Moreover both silicas according to the present invention exhibit a uniform heat build up in spite of the higher surface area compared to Ultrasil VN2 GR. This corresponds to equally good heating behavior under dynamic stress, from which an equally high service life of the elastomer mixture under stress is derived.

The invention claimed is:

1. A precipitated silica comprising
   a BET surface area of 150-400 m$^2$/g,
   a CTAB surface area of 145-350 m$^2$/g,
   an Al$_2$O$_3$ content of 0.2-5% by weight and
   a modified Sears number V$_2$ of 5-35 ml/(5 g), and
   a BET/CTAB surface ratio of from 1.33 to 2.43.

2. The precipitated silica of claim 1, wherein the precipitated silica has a DBP absorption of from 180 to 320 g/100 g.

3. The precipitated silica of claim 1, wherein the precipitated silica has a wk coefficient ≦3.4.

4. The precipitated silica of claim 1, wherein the precipitated silica surface has been modified with an organosilance of the formulae

 (I),

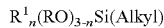 (II)

or

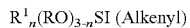 (III), in which
   B is —SCN, —SH, —SC(O)CH$_3$, —SC(O)(CH$_2$)$_6$CH$_3$, Cl, —NH$_2$, —OC(O)CHCH$_2$, —OC(O)C(CH$_3$)CH$_2$ (if q=1), or —S$_x$— (if q=2),
   R and R$^1$ are each an aliphatic, olefinic, aromatic or arylaromatic radical having 2 to 30 carbon atoms, and optionally substituted with the following groups; hydroxyl, amino, alkoxide, cyanide, thiocyanide, halogen, sulfonic acid, sulfonic ester, thiol, benzoic acid, benzoic ester, carboxylic acid, carboxylic ester, acrylate, methacrylate or organosilane radical, it being possible for R and R$^1$ to have an identical or different definition or substitution,
   n is 0, 1 or 2,
   Alk is a divalent unbranched or branched hydrocarbon radical having 1 to 6 carbon atoms, m is 0 or 1,
   Ar is an aryl radical having 6 to 12 carbon atoms, which can be substituted by the following groups: hydroxyl, amino, alkoxide, cyanide, thiocyanide, halogen, sulfonic acid, sulfonic ester, thiol, benzoic acid, benzoic ester, carboxylic acid, carboxylic ester or organosilane radical,
   p is 0 or 1, with the proviso that p and n are not simultaneously 0,
   x is a number from 2 to 8,
   r is 1, 2 or 3, with the proviso that r+n+m+p=4,
   Alkyl is a monovalent unbranched or branched unsaturated hydrocarbon radical having 1 to 20 carbon atoms, Alkenyl is a monovalent unbranched or branched unsaturated hydrocarbon radical having 2 to 20 carbon atoms.

5. The precipitated silica of claim 4, wherein Ar has 6 carbon atoms, Alkyl has 2 to 8 carbon atoms, and Alkenyl has 2 to 8 carbon atoms.

6. The precipitated silica of claim 1, wherein the BET surface area is 195-400 m$^2$/g.

7. A process for preparing the precipitated silica of claim 1
   a) charging an aqueous waterglass solution into a reactor,
   b) metering waterglass and sulfuric acid as components into the reactor simultaneously into this initial charge at from 55 to 95° C. for from 30 to 100 minutes with stirring forming a mixture,
   c) acidifying the mixture with the sulfuric acid to a pH of about 5 to form the precipitated silica, and
   d) filtering and drying the precipitated silica,
   with the proviso that aluminum compounds are added in steps b) and/or c).

8. The process of claim 7, wherein the components supplied in steps b) and c) each have an identical or different concentration.

9. The process of claim 7, wherein the components supplied in steps b) and c) each have an identical feed rate.

10. The process of claim 7, wherein the components supplied in steps b) and c) each have a different feed rate.

11. The process of claim 10, wherein with an identical concentration of the components in steps b) and c) the feed rate in step c) is from 110 to 200% of the feed rate in step b).

12. The process of claim 10, wherein with an identical concentration of the components in steps b) and c) the feed rate in step c) is from 50 to 100% of the feed rate in step b).

13. The process of claim 7, wherein the drying is carried out by spin-flash, nozzle tower or spray drying and/or granulation with/without a roll compactor.

14. The process of claim 7, wherein the precipitated silica is modified with organosilanes of the formula I to III mixtures of from 0.5 to 50 parts, based on 100 parts of precipitated silica, in particular from 1 to 15 parts, based on 100 parts of precipitated silica, the reaction between precipitated silica and organosilane being carried out during the preparation of the mixture (in situ) or externally by spray application and subsequent thermal conditioning of the mixture or by mixing of the silane and the silica suspension with subsequent drying and thermal conditioning.

15. A vulcanizable rubber mixture or vulcanizate comprising the precipitated silica of claim 1.

16. A tire comprising the precipitated silica of claim 1.

17. A vulcanizable rubber mixture or vulcanizate comprising the precipitated silica prepared according to claim 7.

18. A tire comprising the precipitated silica prepared according to claim 7.

19. A battery separator, an anti-blocking agent, a flatting agent in a paint, a paper coating, a defoamer, a gasket, a keypad, a conveyor belt or a window seal comprising the precipitated silica as claimed in claim 1.

* * * * *